(12) United States Patent
Onoe

(10) Patent No.: US 7,647,941 B2
(45) Date of Patent: Jan. 19, 2010

(54) AIR PULSER

(76) Inventor: Masao Onoe, 2-8-8, Umamikita, Koryo-cho, Kitakatsuragi-gun, Nara (JP)

( * ) Notice: Subject to any disclaimer, the term of this patent is extended or adjusted under 35 U.S.C. 154(b) by 336 days.

(21) Appl. No.: 11/395,149

(22) Filed: Apr. 3, 2006

(65) Prior Publication Data
US 2007/0228069 A1 Oct. 4, 2007

(51) Int. Cl.
*F16K 31/128* (2006.01)
(52) U.S. Cl. .................... 137/489; 251/175
(58) Field of Classification Search ............ 137/489; 251/65, 359–365, 333, 334, 175
See application file for complete search history.

(56) References Cited

U.S. PATENT DOCUMENTS

| | | | | |
|---|---|---|---|---|
| 2,315,797 | A | * | 4/1943 | Kinzie .................... 137/625.37 |
| 3,771,800 | A | * | 11/1973 | Wilson et al. ............... 277/502 |
| 4,027,852 | A | * | 6/1977 | Braukmann ................. 251/333 |
| 4,367,767 | A | * | 1/1983 | Hurd ......................... 137/489 |
| 4,489,754 | A | * | 12/1984 | Seessle et al. ............... 137/528 |
| 4,945,946 | A | * | 8/1990 | Gangloff ............... 137/516.13 |
| 5,195,552 | A | | 3/1993 | Nehm |
| 5,251,871 | A | * | 10/1993 | Suzuki ....................... 251/127 |
| 2003/0017012 | A1 | * | 1/2003 | Onoe ......................... 406/108 |

FOREIGN PATENT DOCUMENTS

| | | |
|---|---|---|
| JP | 52-75837 | 11/1950 |
| JP | 56-102864 | 1/1955 |
| JP | 56-102865 | 1/1955 |
| JP | 46-788 | 1/1971 |
| JP | 58-149659 | 10/1983 |
| JP | 58-193159 | 12/1983 |
| JP | 62-55775 | 4/1987 |
| JP | 5-180353 | 7/1993 |
| JP | 5-330652 | 12/1993 |
| JP | 6-30735 | 4/1994 |

(Continued)

OTHER PUBLICATIONS

Notice of Grounds of Rejection issued Feb. 19, 2008 in JP 2004-374012 which is a foreign counterpart to the present application (and its English translation).

*Primary Examiner*—John Rivell
*Assistant Examiner*—William McCalister
(74) *Attorney, Agent, or Firm*—Wenderoth, Lind & Ponack, L.L.P.

(57) ABSTRACT

An air pulser includes a housing. The interior of the housing is divided into an air supply chamber and an exhaust chamber by a diaphragm formed with an aperture. An air injection tube is provided in the air supply chamber and configured to be selectively opened and closed by the diaphragm. The exhaust chamber is divided into first and second chambers by a valve plate formed with a valve hole. In the second chamber, a guide tube is fixedly mounted in which a valve body is slidably supported. The valve body carries a permanent magnet adapted to be attracted to the valve plate and carrying a suction disk. A seal member is disposed between the guide tube and the valve plate. A plurality of radial grooves having a V-shaped cross-section are formed on the surface of the valve plate facing the suction plate at its radially inner portion.

4 Claims, 9 Drawing Sheets

FOREIGN PATENT DOCUMENTS

| | | |
|---|---|---|
| JP | 3046444 | 12/1997 |
| JP | 2001-141084 | 5/2001 |
| JP | 2001-263516 | 9/2001 |
| JP | 2002-153775 | 5/2002 |
| JP | 2003-034429 | 2/2003 |

* cited by examiner

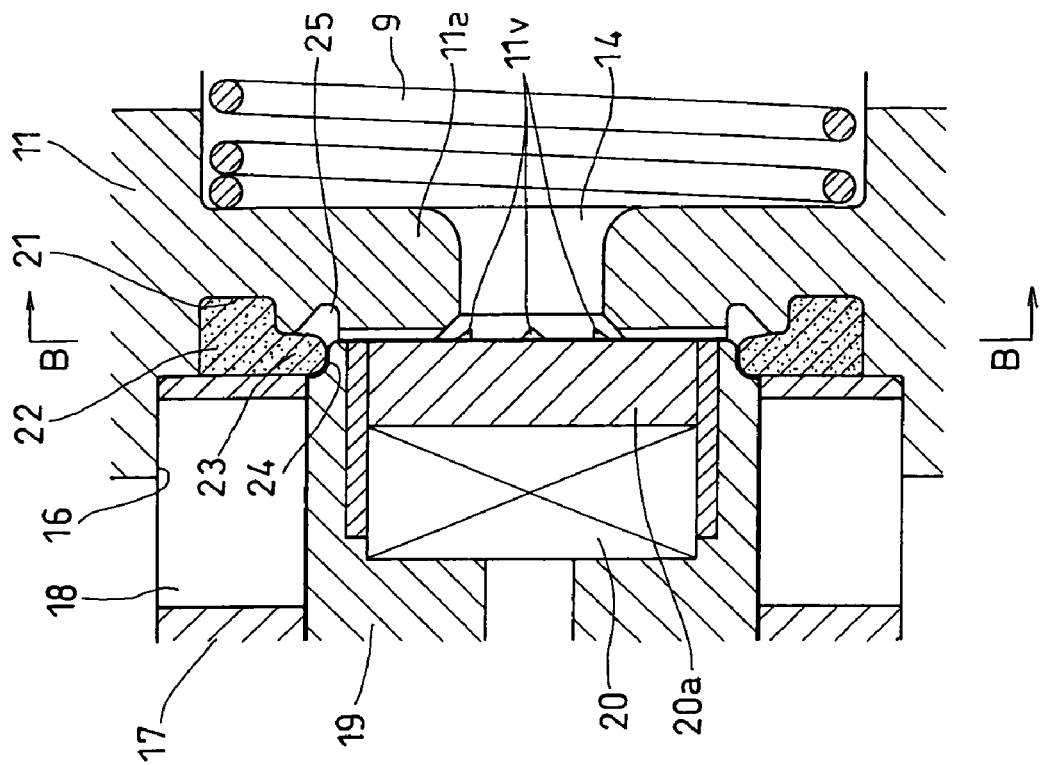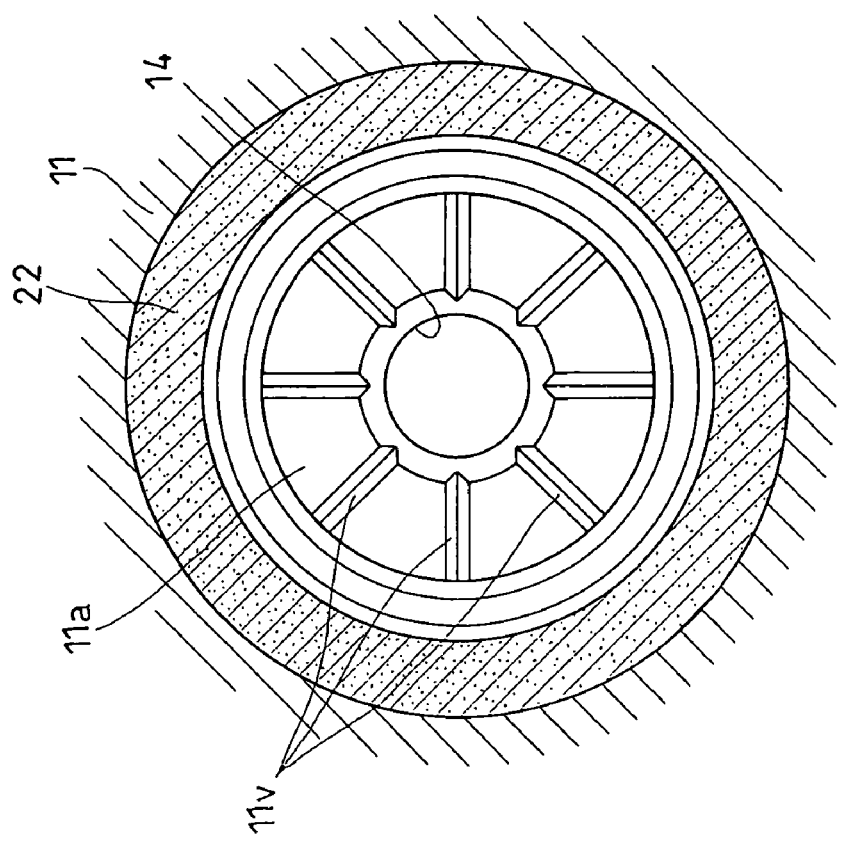

AIR PULSER

BACKGROUND OF THE INVENTION

This invention relates to an air pulser used to pneumatically transport e.g. powder by intermittently injecting air.

It is known to pneumatically transport powder and particles, or break bridges of powder or particles in a hopper, by intermittently injecting compressed air.

For example, JP patent publication 5-330652A (Patent document 1) discloses a carrier for powder and particles, which includes a compressed air supply source in the form of a compressor and a pressurizing tank connected to the compressed air supply source through a first passage. A transport pipe for powder and particles is connected to a lower outlet of the pressurizing tank, and communicates with the compressed air supply source through a second passage. A solenoid valve is provided in each of the first and second passages. By controlling the solenoid valves with a control unit, air pulses are produced alternately in the pressurizing tank and the transport pipe. Air pulses produced in the pressuring tank fluidize the powder or particles in the tank, thereby reducing bridges. Air pulses produced in the transport pipe serve to pneumatically transport powder or particles discharged into the transport pipe from the pressuring tank.

An air vibrator is disclosed in JP patent publication 6-30735B (Patent publication 2), which includes a cylinder having a valve chamber at its upper portion, and a diaphragm extending in the valve chamber to divide the valve chamber into an upper chamber and a lower chamber into which compressed air is introduced. The diaphragm is formed with an aperture through which the upper and lower chambers communicate with each other. A solenoid valve is connected to an exhaust port formed in the peripheral wall of the upper chamber. Thus, by opening the solenoid valve, compressed air in the upper chamber is exhausted. When compressed air is exhausted and the pressure in the upper chamber falls, the diaphragm is deflected toward the upper chamber, thus closing its top end. Compressed air is thus intermittently fed from the lower chamber into the cylinder. The compressed air pushes down a piston in the cylinder and the piston hits a striking plate.

Because such a carrier or air vibrator needs a solenoid valve to produce air pulses, the entire apparatus tends to be large. Since a control unit is necessary to control the solenoid valve, the entire apparatus tends to be costly. In order to solve these problems, the applicant of the present invention proposed in JP patent publication 2003-34429A (Patent publication 3) an air pulser which can produce air pulses simply by continuously feeding compressed air without using a solenoid valve.

The air pulser disclosed in Patent publication 3 includes a diaphragm provided in a housing to divide the interior of the housing into an air supply chamber and an exhaust chamber. In the air supply chamber, an air injection tube is provided which is selectively opened and closed by the diaphragm. In the exhaust chamber, a valve plate is provided which divides the exhaust chamber into a first chamber and a second chamber. The valve plate is formed with a valve hole through which the first and second chambers communicate with each other. In the second chamber, a valve body is mounted to open and close the valve hole formed in the valve plate. A permanent magnet retained by the valve body is attracted to the valve plate to keep the valve body in the closed position.

Compressed air supplied into the air supply chamber through an air supply port formed in the housing flows into the first chamber through an aperture formed in the diaphragm. When the pressure in the first chamber rises above the attraction force of the permanent magnet, the valve body retracts, allowing the compressed air in the exhaust chamber to flow out of the exhaust chamber through an exhaust port. When the pressure in the exhaust chamber falls as a result, the diaphragm is deformed toward the exhaust chamber, allowing the compressed air in the air supply chamber to be discharged through the air injection tube.

In the arrangement of Patent publication 3, the permanent magnet has a flat, circular end surface adapted to directly contact a flat, circular inner surface of the valve plate. Since the magnetic flux produced by the permanent magnet is distributed unevenly and continuously over the entire circumference, a large force is often necessary to attract the permanent magnet to the valve plate and separate the former from the latter. This makes it difficult to maintain constant operational intervals and pressures. In the worst case, the permanent magnet may remain attracted to the valve plate. Thus, the difference between the upper and lower limits of the operational air pressure is large, which tends to destabilize the operation of the air pulser, thus making it impossible to operate the air pulser with high accuracy.

Another problem with the air pulser disclosed in Patent publication 3 is that if high-pressure air in the first chamber leaks through a gap between the valve body and the valve plate into the second chamber with the valve hole formed in the valve plate closed by the valve body, the pressure in the first chamber does not rise, thus making it impossible to intermittently discharge air.

In order to prevent these problems, Patent publication 3 proposes to form a recess in the surface of the valve plate facing the valve body into which the front end of the valve body is received, and mount an O-ring in a groove formed in the inner periphery of the recess. With this arrangement, when the valve body is moved to its closed position, the O-ring is brought into contact with a tapered surface formed on the outer periphery of the valve body at its front end, thus sealing any gap between the valve plate and the valve body. But actually, it is difficult to bring the O-ring into contact with the tapered surface of the valve body over its entire inner periphery. Thus, leakage of a small amount of air is unavoidable, which makes it impossible to operate the air pulser with high accuracy.

A first object of the present invention is to stabilize the opening and closing of the valve body of the air pulser of the above-described type by reducing the operational pressure difference due to fluctuations in its amplitude when the valve body is magnetically attracted to and separates from the valve plate.

A second object of the invention is to reliably prevent leakage of air into the second chamber of the air pulser of the above-described type through any gap between the valve body and the valve plate when the valve body is in its closed position with the permanent magnet attracted to the valve plate.

SUMMARY OF THE INVENTION

In order to accomplish the first-mentioned object, there is provided an air pulser comprising a housing defining an inner space, a diaphragm extending in the inner space to divide the inner space into an air supply chamber and an exhaust chamber, the diaphragm being formed with an aperture through which the air supply chamber communicates with the exhaust chamber, an air injection tube provided in the air supply chamber and configured to be selectively opened and closed by the diaphragm, a valve plate provided in the exhaust chamber and dividing the exhaust chamber into a first chamber and a second chamber, the valve plate being formed with a valve hole through which the first and second chambers communicate with each other, a spring mounted in the first chamber for biasing and deforming the diaphragm such that the air injection tube is closed by the diaphragm, a valve body provided in the second chamber for selectively opening and closing the valve hole, a guide tube provided in the second chamber and supporting the valve body so as to be movable relative to the valve plate, the guide tube being formed with vent holes at both ends thereof, the second chamber communicating with the interior of the guide tube through the vent holes, a permanent magnet mounted to the valve body and configured to be attracted to the valve body to keep the valve body in a closed position wherein the valve hole is closed by the valve body, the housing being formed with an air supply port through which compressed air is fed into the air supply chamber, and an exhaust port through which air in the second chamber is exhausted, and a suction disk mounted on a surface of the permanent magnet that faces the valve plate, the valve plate being formed with a plurality of angularly spaced apart radial grooves in a surface thereof axially facing the suction plate, the surface of the valve plate being located at a radially inner portion of the valve plate.

With this arrangement, air pulses are produced at predetermined time intervals. Specifically, when compressed air is supplied into the air supply chamber through the air supply port, the compressed air partially flows into the first chamber of the exhaust chamber through the aperture formed in the diaphragm. When the pressure in the first chamber exceeds the magnetic attraction force of the permanent magnet, the valve body retracts, thus opening the valve hole. Compressed air in the first chamber thus flows through the valve hole into the second chamber and exhausted through the exhaust port.

When, as a result, the pressure in the exhaust chamber falls below the pressure in the air supply chamber, the diaphragm is deformed toward the exhaust chamber. This opens the air inlet of the air injection tube, allowing the compressed air in the air supply chamber to flow into the air injection tube and to be discharged therefrom. When the pressure in the exhaust chamber falls to a level substantially equal to the atmospheric pressure, the permanent magnet is attracted to the valve plate by the magnetic attraction force produced by the permanent magnet, so that the valve hole is again closed by the valve body. As a result, the pressure in the first chamber increases, causing the diaphragm to be deformed toward the air supply chamber. The diaphragm thus closes the air inlet of the air injection tube, thus stopping the supply of compressed air into the air injection tube. This operation is repeated to produce air pulses from the air injection tube.

In order to reliably and accurately produce air pulses, it is necessary to minimize the operational pressure difference between upper and lower limits due to fluctuations in its amplitude when the valve body is magnetically attracted to and separates from the valve plate, thereby stabilizing the opening and closing of the valve body. In the above-described arrangement of the present invention, a suction disk is mounted to the surface of the permanent magnet facing the valve plate, and the valve plate is formed with a plurality of angularly spaced apart radial grooves in a surface thereof axially facing the suction plate, the surface of the valve plate being located at a radially inner portion of the valve plate. The magnetic flux produced by the permanent magnet is thus circumferentially divided. This eliminates excessive attraction force and separation force due to uneven distribution of the magnetic flux and its continuation.

Thus, the amplitude of the operational pressure between the upper and lower limits and its fluctuations decrease, and the response when the valve body is attracted to and separates from the valve plate improves. This stabilizes the opening and closing of the valve body, so that the air pulser can be operated with extremely high accuracy.

In order to accomplish the second-mentioned object, there is provided an air pulser comprising a housing defining an inner space, a diaphragm extending in the inner space to divide the inner space into an air supply chamber and an exhaust chamber, the diaphragm being formed with an aperture through which the air supply chamber communicates with the exhaust chamber, an air injection tube provided in the air supply chamber and configured to be selectively opened and closed by the diaphragm, a valve plate provided in the exhaust chamber and dividing the exhaust chamber into a first chamber and a second chamber, the valve plate being formed with a valve hole through which the first and second chambers communicate with each other, a spring mounted in the first chamber for biasing and deforming the diaphragm such that the air injection tube is closed by the diaphragm, a valve body provided in the second chamber for selectively opening and closing the valve hole, a guide tube provided in the second chamber and supporting the valve body so as to be movable relative to the valve plate, the guide tube being formed with vent holes at both ends thereof, the second chamber communicating with the interior of the guide tube through the vent holes, a permanent magnet mounted to the valve body and configured to be attracted to the valve body to keep the valve body in a closed position wherein the valve hole is closed by the valve body, the housing being formed with an air supply port through which compressed air is fed into the air supply chamber, and an exhaust port through which air in the second chamber is exhausted, and a seal member disposed between the valve plate and the guide tube and including an annular seal lip provided on a radially inner periphery thereof, the seal lip being configured to be elastically pressed against a tapered surface formed on a radially outer periphery of the valve body at a front end thereof, the guide tube including an annular protrusion formed on a radially inner periphery of the guide tube at a front end thereof for preventing the seal lip from being deformed into the guide tube.

In order to accomplish the second object, there is also provided an air pulser comprising a housing defining an inner space, a diaphragm extending in the inner space to divide the inner space into an air supply chamber and an exhaust chamber, the diaphragm being formed with an aperture through which the air supply chamber communicates with the exhaust chamber, an air injection tube provided in the air supply chamber and configured to be selectively opened and closed by the diaphragm, a valve plate provided in the exhaust chamber and dividing the exhaust chamber into a first chamber and a second chamber, the valve plate being formed with a valve hole through which the first and second chambers communicate with each other, a spring mounted in the first chamber for biasing and deforming the diaphragm such that the air injection tube is closed by the diaphragm, a valve body provided in the second chamber for selectively opening and closing the valve hole, a guide tube provided in the second chamber and supporting the valve body so as to be movable relative to the valve plate, the guide tube being formed with vent holes at both ends thereof, the second chamber communicating with the interior of the guide tube through the vent holes, a permanent magnet mounted to the valve body and configured to be attracted to the valve body to keep the valve body in a closed position wherein the valve hole is closed by the valve body, the housing being formed with an air supply port through which compressed air is fed into the air supply chamber, and an exhaust port through which air in the second chamber is exhausted, and a seal member disposed between the valve plate and the guide tube and including an annular seal lip provided on a radially inner periphery thereof, the valve body being formed with a stepped portion on a radially outer periphery at a front end thereof, the stepped portion comprising a large-diameter surface, a small-diameter surface and a radially extending end surface connecting the large-diameter surface with the small-diameter surface, the seal lip being configured to be elastically pressed against the stepped portion.

With this arrangement, air pulses are produced at predetermined time intervals. Specifically, when compressed air is supplied into the air supply chamber through the air supply port, the compressed air partially flows into the first chamber of the exhaust chamber through the aperture formed in the diaphragm. When the pressure in the first chamber exceeds the magnetic attraction force of the permanent magnet, the valve body retracts, thus opening the valve hole. Compressed air in the first chamber thus flows through the valve hole into the second chamber and exhausted through the exhaust port.

When, as a result, the pressure in the exhaust chamber falls below the pressure in the air supply chamber, the diaphragm is deformed toward the exhaust chamber. This opens the air inlet of the air injection tube, allowing the compressed air in the air supply chamber to flow into the air injection tube and to be discharged therefrom. When the pressure in the exhaust chamber falls to a level substantially equal to the atmospheric pressure, the permanent magnet is attracted to the valve plate by the magnetic attraction force produced by the permanent magnet, so that the valve hole is again closed by the valve body. As a result, the pressure in the first chamber increases, causing the diaphragm to be deformed toward the air supply chamber. The diaphragm thus closes the air inlet of the air injection tube, thus stopping the supply of compressed air into the air injection tube. This operation is repeated to produce air pulses from the air injection tube.

In order to reliably and accurately produce air pulses, it is necessary to prevent leakage of air into the second chamber through a gap between the valve body and the valve plate when the valve body is in its closed position with the permanent magnet attracted to the valve plate. In either of the second and third arrangements of the present invention, a seal member is disposed between the valve plate and a seal lip is formed on the seal member to prevent leakage of air into the second chamber utilizing the elasticity of the seal lip. Thus, the seal lip seals the valve body over the entire circumference thereof, thus positively preventing leakage of air.

In the second arrangement, the annular seal lip formed on the inner periphery of the seal member is adapted to be elastically pressed against the tapered surface formed on the outer periphery of the valve body at its front end. With the valve body in its closed position, the seal lip is elastically pressed against the tapered surface of the valve body. When the pressure in the first chamber increases, the contact pressure of the seal lip against the tapered surface increases. Thus, the sealability of the seal lip is extremely high, so that it can completely prevent leakage of air into the second chamber through any gap between the valve body and the valve plate. The air pulser can thus be operated with extremely high accuracy.

The annular protrusion formed on the inner periphery of the guide tube near its front end prevents the seal lip from getting trapped between the tapered surface of the valve body and the inner periphery of the guide tube near its front end even if the radially inner portion of the seal lip is deformed into the guide tube due to a pressure increase in the first chamber. This ensures smooth retraction of the valve body when the pressure in the first chamber increases. The air pulser can thus be operated with extremely high accuracy.

In the third arrangement, the seal lip formed on the inner periphery of the seal member is elastically pressed against the stepped portion formed on the outer periphery of the valve body at its front end to seal the outer periphery of the valve body utilizing the elasticity of the seal lip. Thus, as in the second arrangement, when the pressure in the first chamber increases, the contact pressure of the seal lip against the stepped portion increases. Thus, the sealability of the seal lip is extremely high, so that it can completely prevent leakage of air into the second chamber through any gap between the valve body and the valve plate. The air pulser can thus be operated with extremely high accuracy.

BRIEF DESCRIPTION OF THE DRAWINGS

Other features and objects of the present invention will become apparent from the following description made with reference to the accompanying drawings, in which:

FIG. 2A is an enlarged sectional view of the valve body of the air pulser of FIG. 1;

FIG. 2B is a sectional view taken along line B-B of FIG. 2A;

DETAILED DESCRIPTION OF THE PREFERRED EMBODIMENTS

Figure 1:
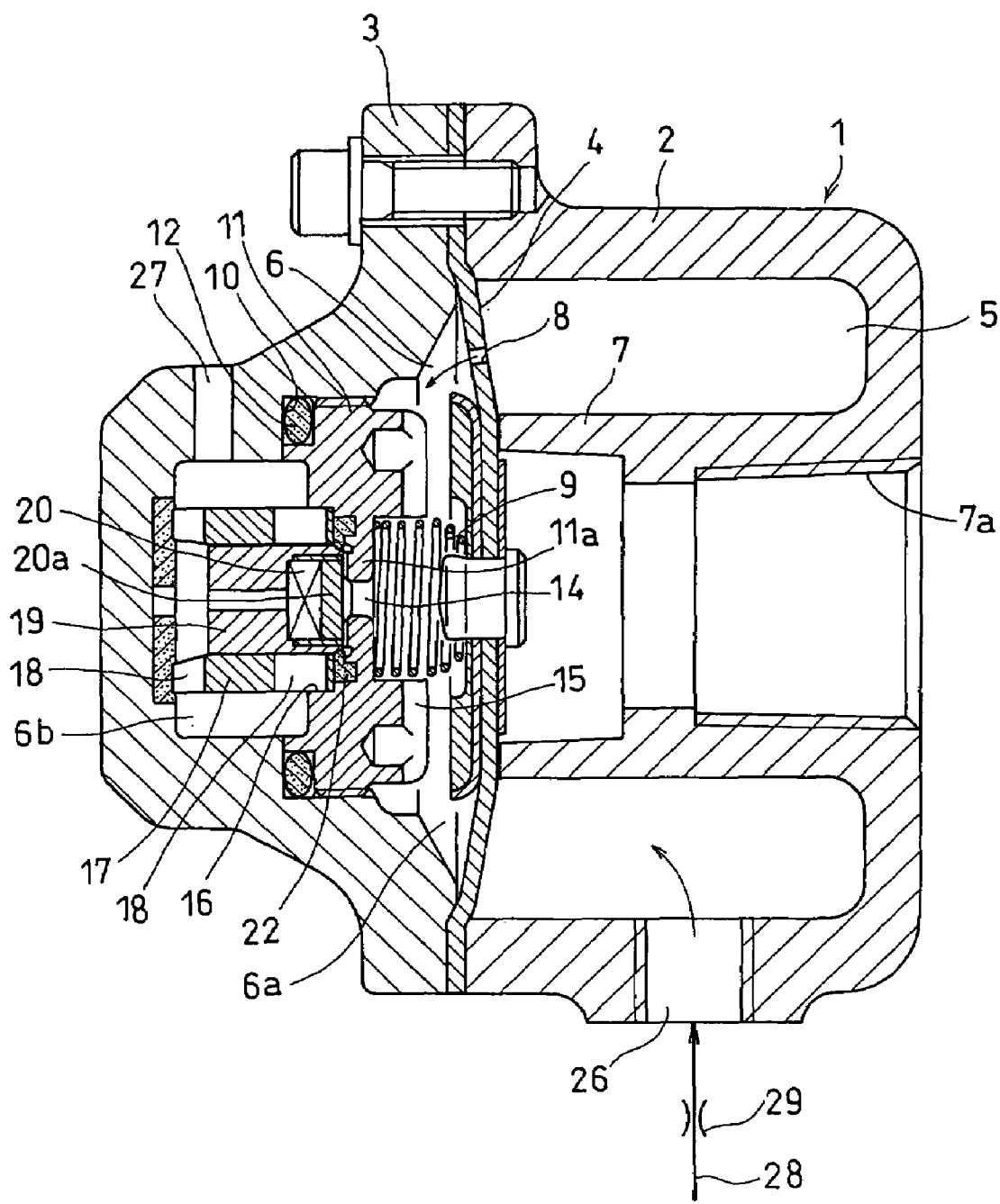
FIG. 1 is a vertical sectional front view of an air pulser according to a first embodiment of the present invention.

The first embodiment of the present invention is now described with reference to the drawings. As shown in FIG. 1, the air pulser of the first embodiment includes a housing 1 comprising a cylindrical body 2 and a head cover 3 bolted to one end of the body. A diaphragm 4 has its outer edge clamped between the body 2 and the head cover 3. The diaphragm 4 divides the interior of the housing 1 into an air supply chamber 5 and an exhaust chamber 6. An air injection tube 7 protrudes into the air supply chamber 5.

The diaphragm 4 is formed with an aperture 8 through which the air supply chamber 5 and the exhaust chamber 6 communicate with each other. A spring 9 mounted in the exhaust chamber 6 elastically biases the diaphragm 4 to press the diaphragm 4 against the air injection tube 7, thereby closing the air inlet of the air injection tube 7. A valve plate 11 is in threaded engagement with the inner peripheral wall of the exhaust chamber 6 and is supported on a shoulder 10 formed on the inner peripheral wall of the exhaust chamber 6. The valve plate 11 divides the exhaust chamber 6 into a first chamber 6a and a second chamber 6b.

An elastic seal 12 is disposed between, and elastically in contact with, the opposed surfaces of the shoulder 10 and the valve plate 11, thereby sealing the gap therebetween. The valve plate 11 is made of a magnetic material so as to be magnetically attracted to a permanent magnet. The valve plate 11 has a valve hole 14 through which the first and second chambers 6a and 6b communicate with each other. Radial grooves 15 are formed in one of the end surfaces of the valve plate 11 facing the first chamber 6a.

A circular recess 16 is formed in the other end surface of the valve plate 11, i.e. the end surface facing the second chamber 6b so as to be concentric with the valve hole 14. A guide tube 17 has its front end inserted in the circular recess 16. By tightening the valve plate 11, the front end of the guide tube 17 is pressed against the wall of the circular recess 16 and its rear end is pressed against the end wall of the second chamber 6b. The guide tube 17 has vent holes 18 at both ends thereof. A valve body 19 is slidably mounted in the guide tube 17 for movement in an axial direction to open and close the valve hole 14. In the front end portion of the valve body 19, which faces a radially inner portion 11a of the valve plate 11, a permanent magnet 20 and a suction disk 20a are embedded. The magnetic attraction force produced by the permanent magnet 20 is applied to the radially inner portion 11a of the valve plate 11 through the suction disk to keep the valve body 19 normally in its closed position.

In a conventional air pulser, the permanent magnet 20 is kept in direct contact with the radially inner portion 11a of the valve plate 11 under its magnetic attraction force to keep the valve body in its closed position. But actually, the valve body 19 is repeatedly attracted to and separates from the valve plate 11, so that its movement tends to be unstable. In this embodiment, in order to stabilize the movement of the valve body 19, the suction disk 20a is mounted on the permanent magnet 20 so that, as shown in FIG. 2A, a solid flat upper surface of the suction disk 20a faces the radially inner portion 11a of a bottom surface of the valve plate 11. Further, in the surface of the radially inner portion 11a of the valve plate 11 that faces the suction disk 20a, a plurality of (i.e. four to eight; eight in the embodiment) radial V grooves 11v (0.4 to 0.6 mm wide) are formed which extend radially outwardly from near the tapered surface of the valve hole 14 so as to be arranged at equal angular intervals.

As shown in FIG. 2A, an annular seal groove 21 is formed in the portion of the end wall of the recess 16 in the valve plate 11 against which the front end of the guide tube 17 is pressed (i.e. the seal groove is formed in the bottom surface of the valve plate 11 so as to open axially downwardly, as shown in FIG. 1A). An annular seal member 22 is received in the seal groove 21 and is pressed against the end wall of the recess 16 and the front end surface of the guide tube 17, thereby sealing any gap therebetween.

The seal member 22 has an annular seal lip 23 formed on the radially inner surface thereof. The seal lip 23 has a radially inner portion having a moderately curved convex cross-section. The valve body 19 has a small-diameter front end. With the valve body 19 in its closed position, the seal lip 23 is elastically pressed against a curved recess (recessed surface) 24 of the valve body 19 which is defined between the small-diameter front end of the valve body 19 and its rear large-diameter portion, thereby preventing any compressed air flowing into the first chamber 6a from leaking through any gap between the opposed surfaces of the valve plate 11 and the valve body 19 into the second chamber 6b. The valve plate 11 has an annular seal-facing groove 25 that permits movement of the seal lip 23. As shown in the drawings, the seal lip 23 has a flat bottom surface extending substantially perpendicular to the axial direction and the recessed surface 24 has an axially facing portion axially facing the flat bottom surface of the seal lip 23, and a radially outwardly facing surface which, in the closed position of the valve body 19, faces a radially inwardly facing surface of the seal lip 23.

While compressed air is not being fed through an air supply port 26, the valve body 19 is in its closed position with the permanent magnet 20 attracted to the valve plate 11, and the air inlet of the air injection tube 7 is closed by the diaphragm 4. When compressed air is fed into the air supply port 26 through an air supply passage 28 while adjusting its flow rate with a variable throttle 29 as a flow regulating valve, the compressed air flows into the air supply chamber 5, and then partially flows through the aperture 8 of the diaphragm 4 into the first chamber 6a of the exhaust chamber 6.

Figure 3:
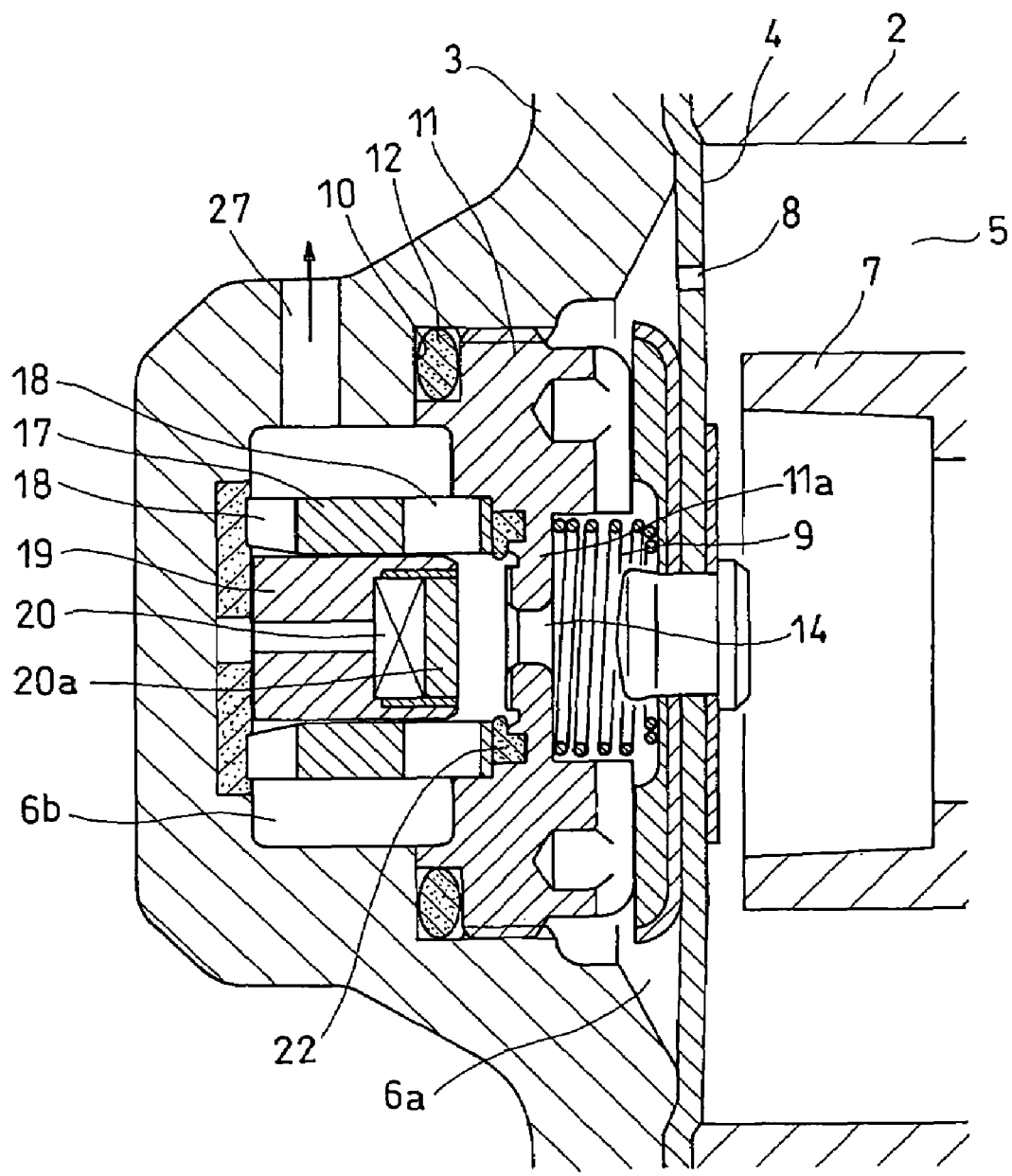
FIG. 3 is a sectional view of the air pulser of FIG. 1, in which the valve body is in its open position.

As the compressed air flows into the first chamber 6a, the pressure in the first chamber 6a gradually rises. When the pressure in the first chamber 6a exceeds the magnetic attraction force of the permanent magnet 20 under which the magnet 20 is attracted to the valve plate 11, the valve body 19 moves backward, thus opening the valve hole 14. When the valve hole 14 opens, compressed air in the first chamber 6a flows into the second chamber 6b through the valve hole 14, and is exhausted through an exhaust port 27. When compressed air is exhausted, the pressure in the exhaust chamber 6 drops. Due to the pressure difference between the air supply chamber 5 and the exhaust chamber 6, the diaphragm 4 is now elastically deformed toward the exhaust chamber 5 as shown in FIG. 3, thus opening the air inlet of the air injection tube 7. This causes compressed air in the air supply chamber 5 to flow into the air injection tube 7 and to be discharged therefrom.

When compressed air in the exhaust chamber 6 is further exhausted and the pressure in the exhaust chamber 6 falls, the magnetic force of the permanent magnet 20 causes the permanent magnet 20 and the suction disk 20a to be attracted toward the radially inner portion 11a of the valve plate 11, thus advancing the valve body 19 until the valve hole 14 is closed. When the valve hole 14 is closed, the pressure in the first chamber 6a of the exhaust chamber 6 rises because the compressed air in the air supply chamber 5 is partially flowing into the first chamber 6a through the aperture 8 in the diaphragm 4. When the pressure in the first chamber 6a becomes substantially equal to the pressure in the air supply chamber 5, the diaphragm 4 is allowed to elastically deform toward the air supply chamber 5, closing the air inlet of the air injection tube 7. Discharge of compressed air from the injection port 7a of the air injection tube 7 thus stops.

Thus, when the pressure in the first chamber 6a exceeds the magnetic attraction force of the permanent magnet 20, the valve body 19 moves backward, opening the valve hole 14. Then, when compressed air in the exhaust chamber 6 is exhausted through the exhaust port 27, and the pressure in the exhaust chamber 6 falls, the valve hole 14 is closed again. When the pressure in the exhaust chamber 6 falls, the diaphragm 4 opens the air inlet of the air injection tube 7. When the valve body 19 is moved to its closed position and the pressure in the first chamber 6a becomes substantially equal to the pressure in the air supply chamber 5, the diaphragm 4 closes the air inlet of the air injection tube. In this way, compressed air is discharged intermittently.

Thus, the air pulser according to the invention can intermittently discharge compressed air without the need for a solenoid valve. The intervals of air pulses discharged from the air injection port 7a of the air injection tube 7 are adjusted by adjusting the variable throttle 29 provided in the air supply passage 28. If, with the valve hole 14 closed by the valve body 19, a large amount of high-pressure air in the first chamber 6a leaks into the second chamber 6b through a gap between the valve plate 11 and the valve body 19, it is impossible to increase the pressure in the first chamber 6a, which makes it impossible to move the valve body 19 backward, thereby intermittently discharge air.

Even if a small amount of compressed air in the first chamber 6a leaks, it takes a long time until the pressure in the first chamber 6a exceeds the attraction force of the permanent magnet 20, so that the intervals of air pulses tend to be long. In the embodiment, since the seal member 22 is mounted between the valve plate 11 and the guide tube 17, and the seal member 22 has the annular seal lip 23 on its inner periphery which is adapted to elastically contact the curved recess 24 formed on the outer periphery of the valve body 19 near its front end, the seal lip 23 elastically contacts the curved surface 24 when the valve body 19 is in its closed position, and when the pressure in the first chamber 6a increases, the contact pressure of seal lip 23 against the curved recess 24 further increases.

The seal member 23 thus reliably seals the gap between the valve plate 11 and the valve body 19, thereby reliably preventing leakage of high-pressure air into the second chamber 6b through this gap. This makes it possible to reliably produce air pulses at predetermined intervals. In actual operation, the valve body 19 is repeatedly attracted to and moved away from the valve plate 11 at short intervals to produce air pulses. In order to produce air pulses at desired intervals, it is necessary to stabilize the movement of the valve body 19 toward and away from the valve plate 11.

Figure 4A:
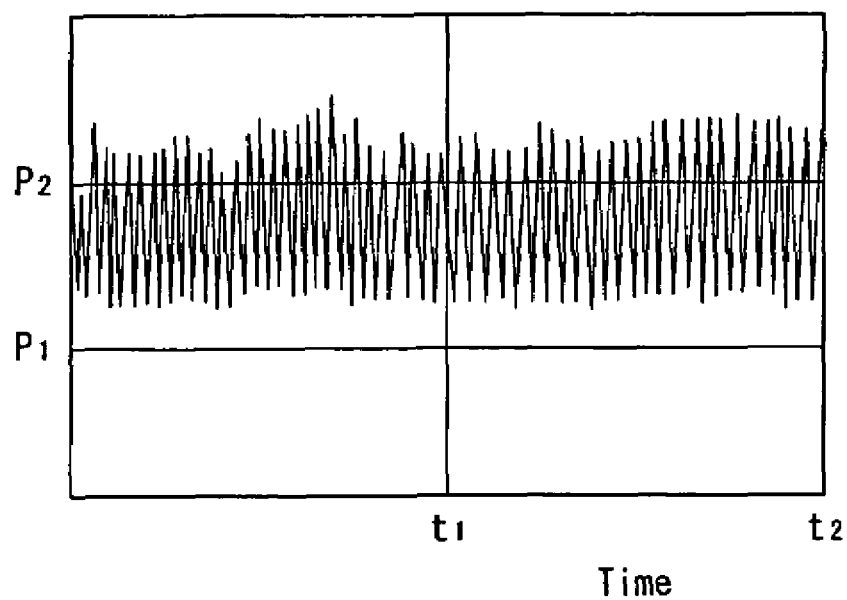
FIGS. 4A and 4B are graphs showing the results of measurement of fluctuations in the pressure difference in a conventional air pulser and the air pulser of the first embodiment of the invention, respectively.
Figure 4B:
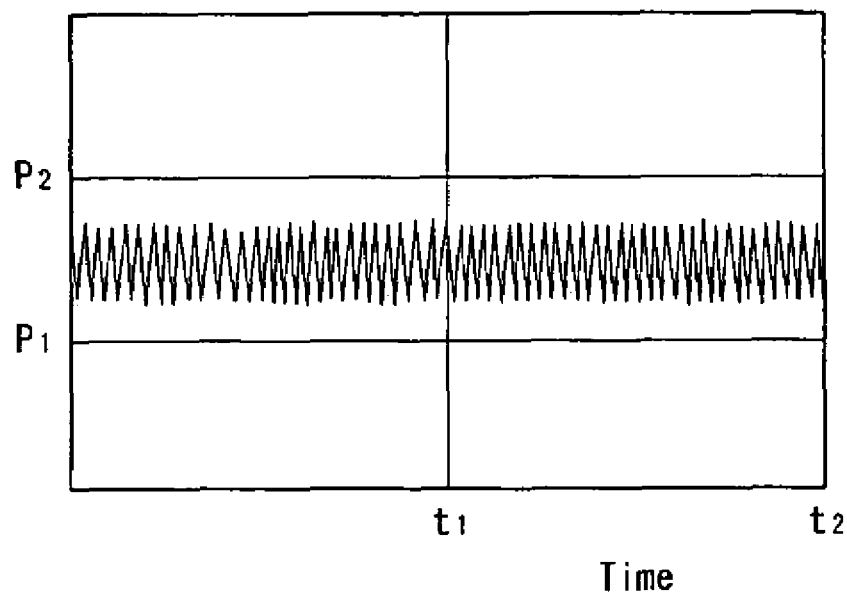

The air pulser of this embodiment has means to stabilize the movement of the valve body 19 relative to the valve plate 11. This means comprises the radial grooves 11v formed in the radially inner portion of the valve plate 11. The radial grooves 11v serve to reduce fluctuations in pressure when the valve body 19 is attracted to and moved away from the valve plate 11 and thus the pressure difference, thereby stabilizing the movement of the valve body 9. FIGS. 4A and 4B show the movement of the valve body of a conventional air pulser (having no radial grooves 11v; orifice diameter: 6 mm; the outer diameter of the area to which the valve body 19 is attracted: 9.4 mm), and the movement of the valve body of the air pulser embodying the invention (having eight radial grooves 11v; orifice diameter: 6 mm; the outer diameter of the area to which the valve body 19 is attracted: 9.4 mm), respectively, as measured by an oscillograph.

In both figures, the horizontal axis represents time and the vertical axis represents pressure fluctuations in air pulses. The bottom and top ends of each amplitude represent the pressures when the valve body 19 is attracted to and is moved away from the valve plate, respectively. As shown in FIG. 4A, the movement of the conventional valve body 19 is large in amplitude, so that air pulses were not necessarily produced smoothly and stably. This is because while the magnetic flux produced by the permanent magnet 20 of the valve body 19 is distributed over the entire circumference, the magnetic flux is distributed unevenly and continuously, so that excessive force is necessary to attract the valve body 19 to and move the valve body 19 away from the valve plate. While not shown, when the pressure and the flow rate of supplied air are changed, the valve body 19 may become unable to move away from the valve plate and remain attracted to the valve plate.

In contrast, as shown in FIG. 4B, in the embodiment, pressure fluctuations when the valve body 19 is attracted to and moved away from the valve plate is smaller. This is because the magnetic flux is divided by the grooves 11v formed in the radially inner portion 11a of the valve plate 11, so that the force applied to the abutment surface of the radially inner portion 11a when the valve body 19 is attracted to and moved away from the valve body has decreased and become uniform. This improves the response of the valve body 19.

FIGS. 4A and 4B show fluctuations in pressure when the air pulse intervals are controlled by adjusting the flow rate of the air supplied with the variable throttle 29 as a flow regulating valve for a desired purpose (e.g. for use as a knocker as shown). In FIGS. 4A and 4B, the letters $t_1$ and $t_2$ indicate 5 and 10 minutes, respectively, and the letters $P_1$ and $P_2$ indicate 0.2 MPa and 0.4 MPa, respectively.

TABLE 1

|  | Prior art | Embodiment |
|---|---|---|
| Flow rate of supplied air L/H | about 118 | about 105 |
| Frequency of movements of the valve body | 0.45 times/5 sec. | 0.45 times/5 sec. |
| Upper limit of operating pressure Mpa(Max) | 0.482 | 0.351 |
| Lower limit of operating pressure Mpa(Min) | 0.263 | 0.233 |

As will be apparent from these results, in the prior art, the pressure difference between the upper and lower limits is large (about 0.2), while in the embodiment, the pressure difference between the upper and lower limits is small (about 0.12).

While no oscillograph is shown, various other measuring results were obtained besides the above results. Only one example thereof is shown in Table 2.

TABLE 2

| Pressure of supplied air | Prior Art | Embodiment |
|---|---|---|
| Upper limit of operating pressure Mpa(Max) | 0.20-0.40 (amplitude) | 0.01-0.02 (amplitude) |
| Lower limit of operating pressure Mpa(Max) | 0.15-0.25 (amplitude) | 0.01-0.02 (amplitude) |

From these results, it will be apparent that by forming the plurality of grooves in the valve plate 11, it is possible to effectively stabilize the movement of the valve body 19. It was confirmed that if the number of grooves is 4 to 6, the measuring results were substantially the same.

Figure 5:
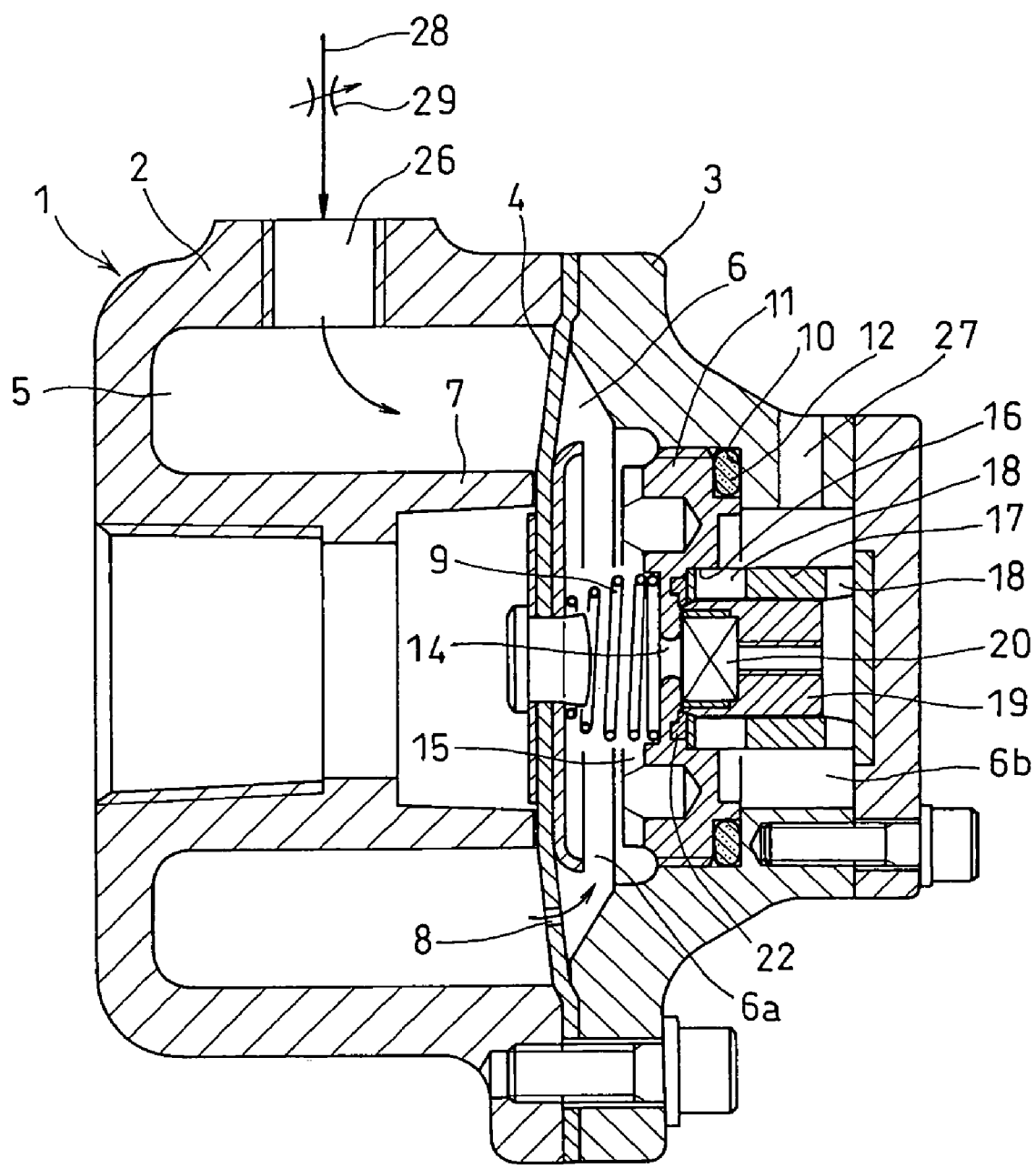
FIG. 5 is a vertical sectional front view of an air pulser according to a second embodiment of the present invention.
Figure 6:
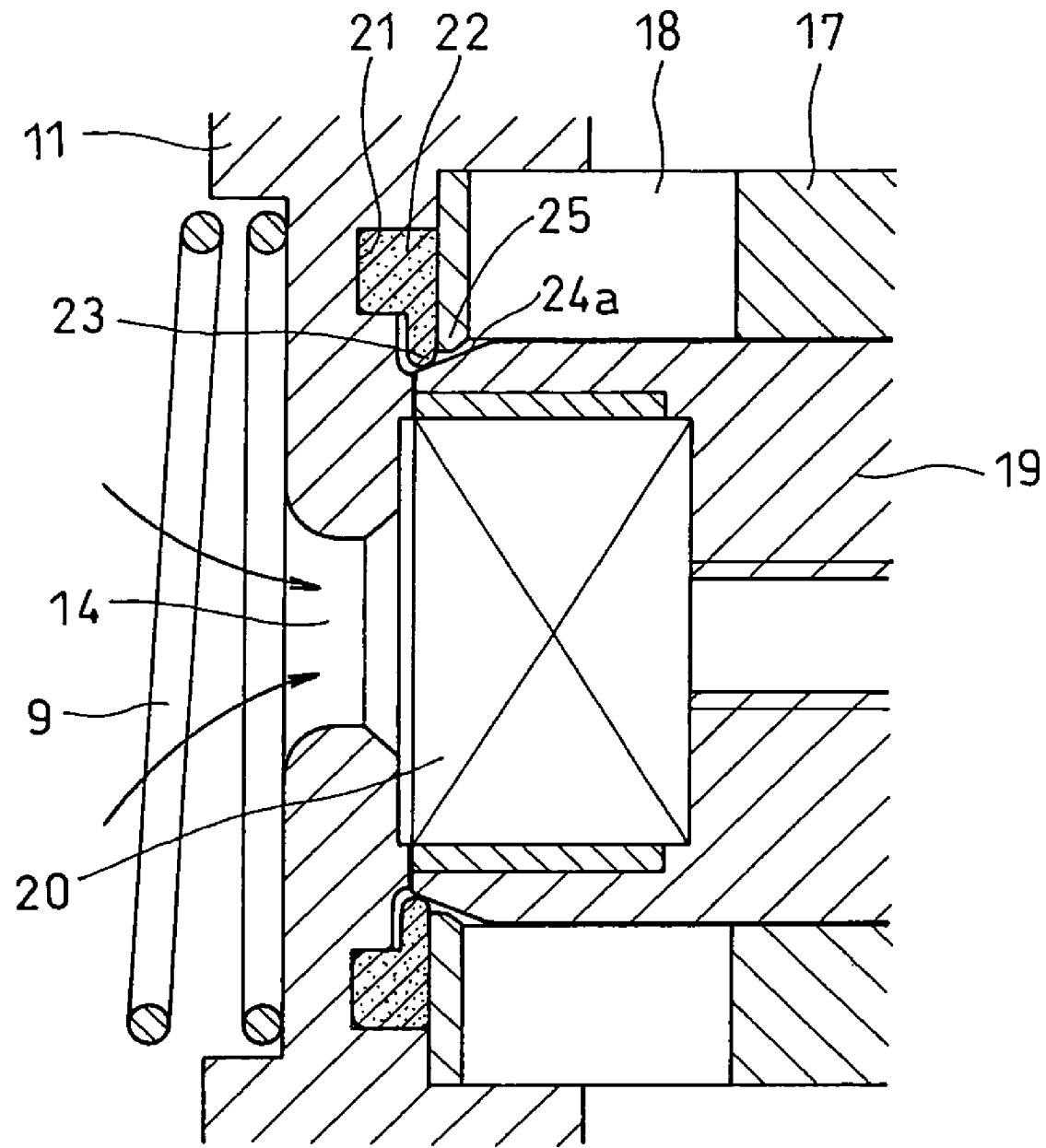
FIG. 6 is an enlarged sectional view of the valve body of the air pulser of FIG. 5.
Figure 7:
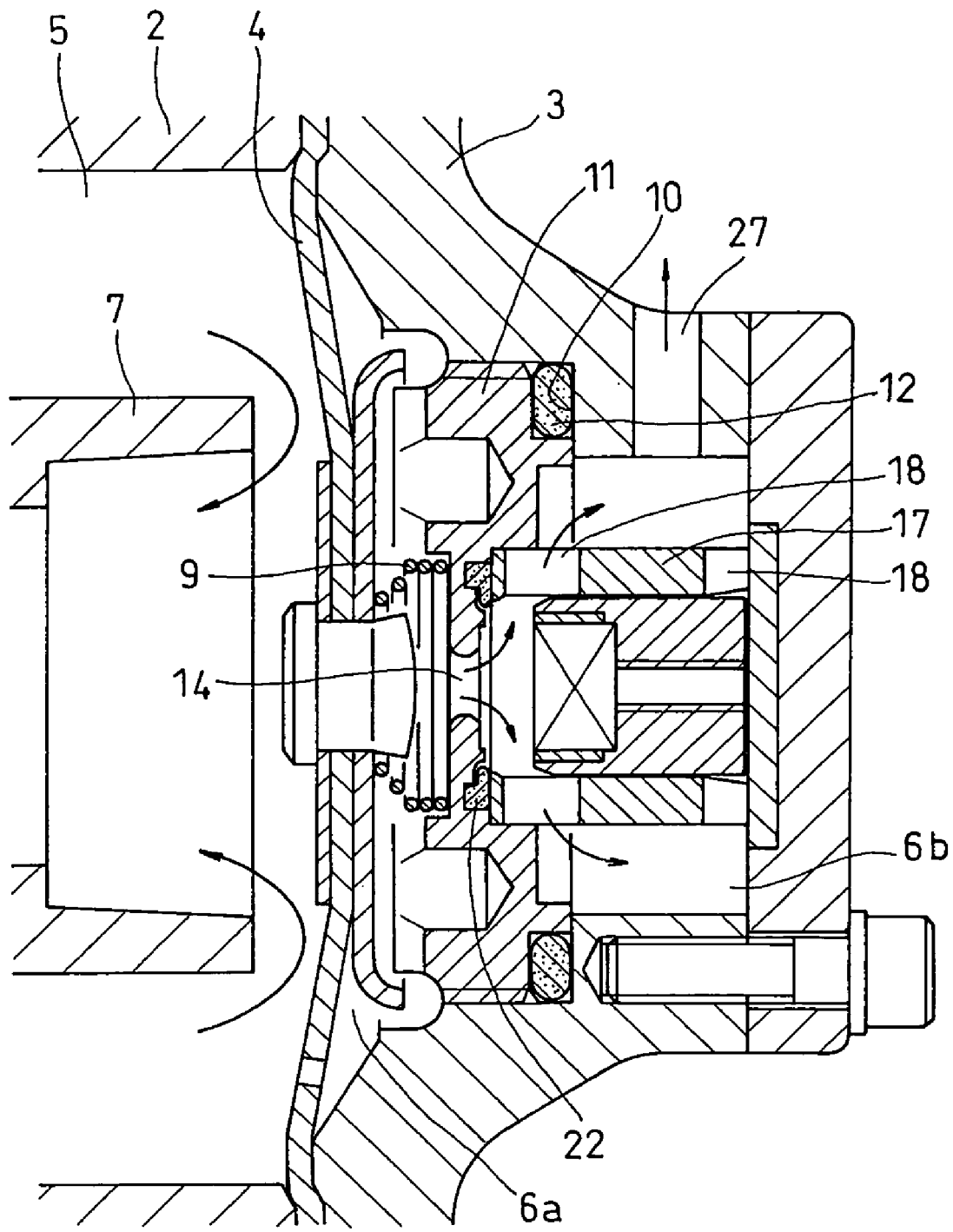
FIG. 7 is a sectional view of the air pulser of FIG. 5, in which the valve body is in its open position.

FIGS. 5 to 7 show the second embodiment, which is basically of the same structure as the first embodiment, so that like elements are denoted by like numerals and their description is omitted. Below, description is made only of elements and functions that are different from those of the first embodiment.

A circular recess 16 is formed in the surface of the valve plate 11 facing the second chamber 6b so as to be concentric with the valve hole 14. A guide tube 17 has its front end inserted in the circular recess 16. By tightening the valve plate 11, the guide tube 17 has its front end in abutment with the end wall of the recess 16 and its rear end in abutment with the end wall of the second chamber 6b. The guide tube 17 has vent holes 18 at both ends thereof. A valve body 19 is slidably received in the guide tube 17 to open and close the valve hole 14. In the front end surface of the valve body 19 facing the valve plate 11, a permanent magnet 20 is embedded. The magnetic attraction force produced by the permanent magnet 20 is applied to the valve plate 11 to keep the valve body 19 normally in its closed position.

As shown in FIG. 6, an annular seal groove 21 is formed in the portion of the end wall of the recess 16 in the valve plate 11 against which the front end of the guide tube 17 is pressed. An annular seal member 22 is mounted in the seal groove 21 and is pressed against the end wall of the recess 16 and the front end surface of the guide tube 17, thereby sealing any gap therebetween.

The seal member 22 has an annular seal lip 23 formed on the radially inner surface thereof. With the valve body 19 in its closed position, the seal lip 23 is elastically pressed against a tapered surface 24a formed on the outer periphery thereof at its front end, thereby preventing any compressed air flowing into the first chamber 6a from leaking through any gap between the opposed surfaces of the valve plate 11 and the valve body 19 into the second chamber 6b.

An annular protrusion 25 is formed on the inner periphery of the guide tube 17 near its front end. The annular protrusion 25 prevents the seal lip 23 from being elastically deformed into the guide tube 17 and wedged into a gap between the tapered surface 24a of the valve body 19 and the inner periphery of the guide tube 17 near its front end. As shown in FIG. 5, the housing 1 is formed with an air supply port 26 communicating with the air supply chamber 5 and an exhaust port 27 communicating with the second chamber 6b. In an air supply passage 28 connected to the air supply port 26, a variable throttle 29 is provided.

While compressed air is not being supplied through the air supply port 26, the valve body 19 is kept in its closed position with the permanent magnet 20 attracted to the valve plate 11 while the air inlet of the air injection tube 7 is closed by the diaphragm 4. When compressed air is fed into the air supply port 26 through the air supply passage 28, the compressed air flows into the air supply chamber 5, and then partially flows through the aperture 8 of the diaphragm 4 into the first chamber 6a of the exhaust chamber 6.

As the compressed air flows into the first chamber 6a, the pressure in the first chamber 6a gradually rises. When the pressure in the first chamber 6a exceeds the magnetic attraction force of the permanent magnet 20 under which the magnet 20 is attracted to the valve plate 11, the valve body 19 moves backward, thus opening the valve hole 14. When the valve hole 14 opens, compressed air in the first chamber 6a flows into the second chamber 6b through the valve hole 14, and is exhausted through an exhaust port 27. When compressed air is exhausted, the pressure in the exhaust chamber 6 drops. Due to the pressure difference between the air supply chamber 5 and the exhaust chamber 6, the diaphragm 4 is now elastically deformed toward the exhaust chamber 5 as shown in FIG. 3, thus opening the air inlet of the air injection tube 7. This causes compressed air in the air supply chamber 5 to flow into the air injection tube 7 and to be discharged therefrom.

When the compressed air in the exhaust chamber 6 is further exhausted and the pressure in the exhaust chamber 6 falls, the magnetic force of the permanent magnet 20 causes the permanent magnet 20 to be attracted toward the valve plate 11, thus advancing the valve body 19 until the valve hole 14 is closed. When the valve hole 14 is closed, the pressure in the first chamber 6a of the exhaust chamber 6 rises because the compressed air in the air supply chamber 5 is partially flowing into the first chamber 6a through the aperture 8 in the diaphragm 4. When the pressure in the first chamber 6a becomes substantially equal to the pressure in the air supply chamber 5, the diaphragm 4 is allowed to elastically deform toward the air supply chamber 5, closing the air inlet of the air injection tube 7. Discharge of compressed air from the injection port 7a of the air injection tube 7 thus stops.

Thus, when the pressure in the first chamber 6a exceeds the magnetic attraction force of the permanent magnet 20, the valve body 19 moves backward, opening the valve hole 14. Then, when compressed air in the exhaust chamber 6 is exhausted through the exhaust port 27, and the pressure in the exhaust chamber 6 falls, the valve hole 14 is closed again. When the pressure in the exhaust chamber 6 falls, the diaphragm 4 opens the air inlet of the air injection tube 7. When the valve body 19 is moved to its closed position and the pressure in the first chamber 6a becomes substantially equal to the pressure in the air supply chamber 5, the diaphragm 4 closes the air inlet of the air injection tube. In this way, compressed air is discharged intermittently. That is, the air pulser of this embodiment can produce air pulses without the need for a solenoid valve.

The intervals of air pulses discharged from the air injection tube 7 are controllable by adjusting the feed rate of compressed air with the variable throttle 29 provided in the air supply passage 28.

If, with the valve hole 14 closed by the valve body 19, a large amount of high-pressure air in the first chamber 6a leaks into the second chamber 6b through a gap between the valve plate 11 and the valve body 19, it is impossible to increase the pressure in the first chamber 6a, which makes it impossible to move the valve body 19 backward, thereby intermittently discharging air. Even if a small amount of compressed air in the first chamber 6a leaks, it takes a long time until the pressure in the first chamber 6a exceeds the attraction force of the permanent magnet 20, so that the intervals of air pulses tend to be long.

In this embodiment, with the valve body 19 in its closed position, the seal lip 23 of the seal member 22 elastically contacts the tapered surface 24a of the valve body 19. When the pressure in the first chamber 6a increases, the contact pressure of the seal lip 23 against the tapered surface 24a increases.

Thus, it is possible to reliably seal the gap between the opposed surfaces of the valve plate 11 and the valve body 19, thus reliably preventing leakage of high-pressure air through this gap into the second chamber 6b.

The annular protrusion 25 formed on the inner periphery of the guide tube 17 at its front end prevents the radially inner portion of the seal lip 23 from being elastically deformed into the guide tube 17 and wedged into a gap between the tapered surface 24a of the valve body 19 and the inner periphery of the guide tube 17 near its front end when the pressure in the first chamber 6a rises. This ensures smooth backward movement of the valve body 19, and thus accurate operation of the air pulser.

Figure 8A:
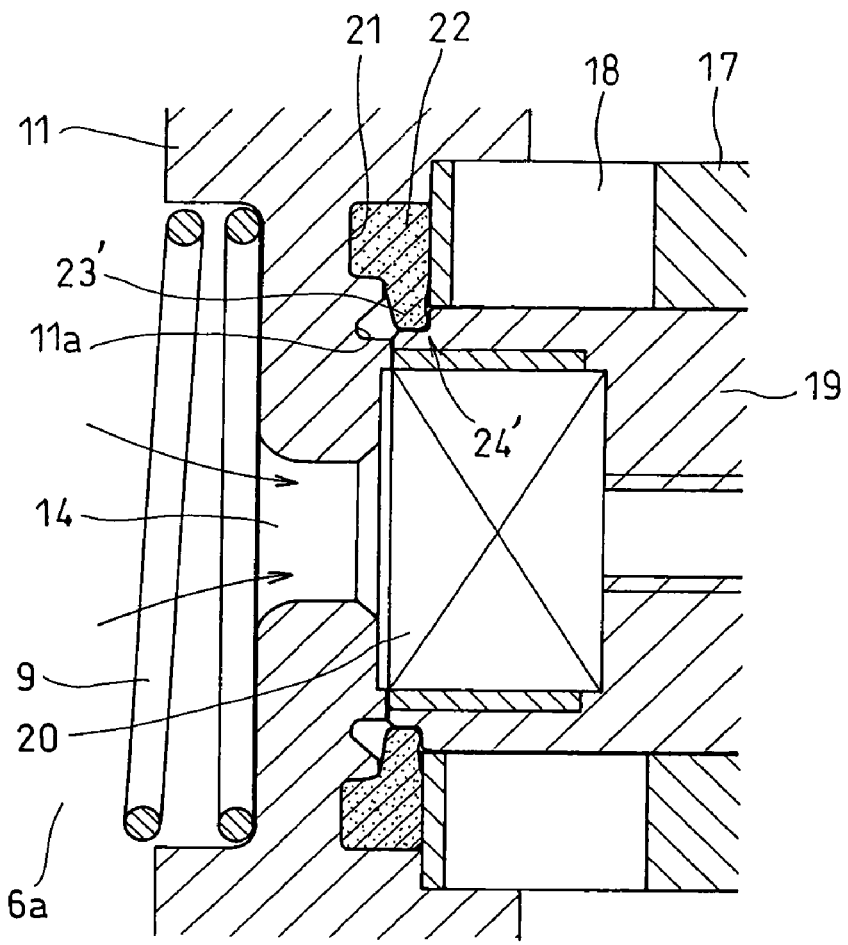
FIG. 8A is a partial enlarged sectional view of an air pulser according to a third embodiment of the invention.
Figure 8B:
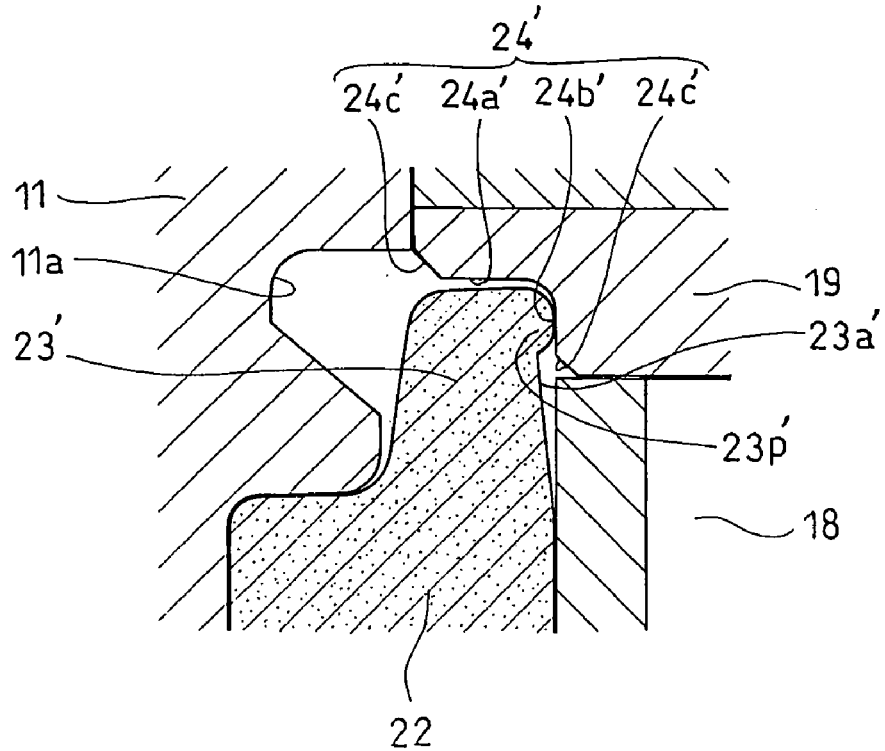
FIG. 8B is an enlarged sectional view of a portion of the air pulser of FIG. 8A including a seal lip.
Figure 9:
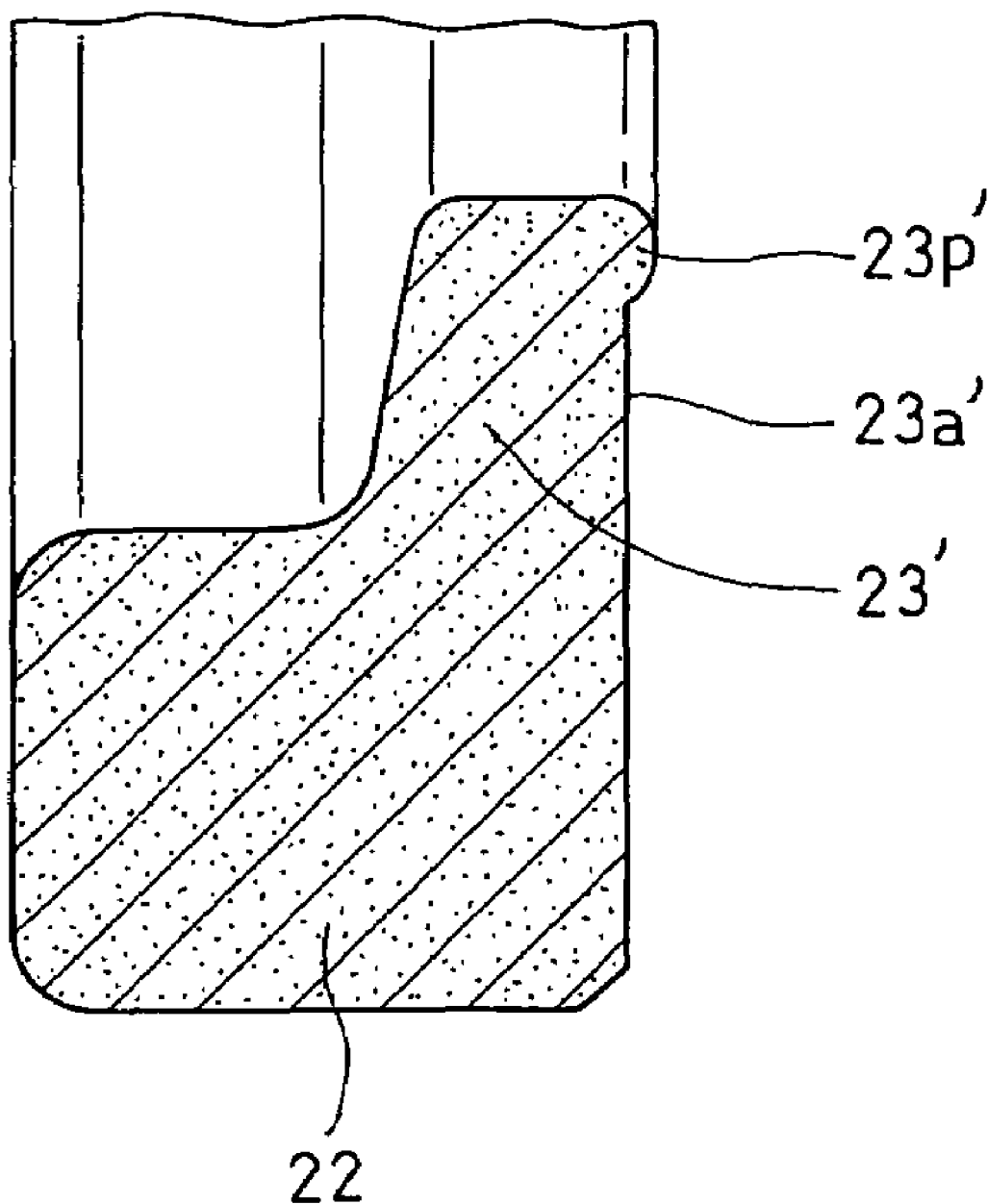
FIG. 9 is a partial sectional view of a seal member when not stressed.

FIGS. 8A, 8B and 9 are partial sectional views of the air pulser of the third embodiment, which differs from the second embodiment in that an annular seal member 22 is provided between the opposed surfaces of the valve plate 11 and the guide tube 17 and valve body 19, that the seal member 22 has a seal lip 23' that is slightly different in shape from the seal lip 23 of the first embodiment, and that the tapered portion 24a is replaced with a stepped portion 24'. Otherwise, the third embodiment is basically identical to the second embodiment. Thus, like elements are denoted by like numerals and their description is omitted.

Below, only elements that are different from those of the second embodiment are described. As shown in FIGS. 8A and 8B, the annular seal member 22 is received in an annular groove 21 formed in the valve plate 11 at its portion facing the front end surface of the guide tube 17. The seal lip 23' of the seal member 22 has a substantially trapezoidal cross-section with its front side tapered radially inwardly. On its side facing the valve body 19, the seal lip 23' has a protrusion 23p' which is hemispherical in an unstressed state as shown in FIG. 9.

This embodiment is the same as the second embodiment in that the seal member 22 is pressed against the front end surface of the guide tube 17 with the seal member 22 received in the seal groove 21, thereby sealing any gap between the valve plate 11 and the guide tube 17 but differs therefrom in that the tapered surface 24a is replaced with the stepped portion 24'. As shown in FIG. 8B, the stepped portion 24' comprises a small-diameter tapered surface 24c' formed at the front end of the valve body 19, a small-diameter cylindrical surface 24a' connected to the rear end of the tapered surface 24c' and having a diameter smaller than the outer diameter of the valve body 19, an end surface 24b' connected to the rear end of the cylindrical surface 24a' and extending perpendicular to the axis of the valve body 19, and a large-diameter tapered surface 24c' connected to the radially outer end of the end surface 24b'.

With the protrusion 23p' of the seal lip 23' in abutment with the end surface 24b' of the stepped portion 24', thereby keeping the valve body 19 in its closed position, the end surface 24b' causes elastic deformation of the protrusion 23p' and the body of the seal lip 23'. Thus, the seal lip 23' is elastically pressed against the valve body 19 by the reaction force of the elastic deformation, thereby preventing leakage of compressed air in the first chamber 6a into the second chamber 6b through a gap between the valve plate 11 and the valve body 19.

A relief groove 11a is formed in the valve plate 11 at its portion radially inwardly of the seal groove 21 to allow the seal lip 23' to be smoothly fit into the groove 21 when the seal lip 23' is pressed axially. The small-diameter cylindrical surface 24a' has a diameter slightly smaller than the inner diameter of the seal lip 23' so that a small gap is defined therebetween. In the embodiment, the end surface 24b' is perpendicular to the axis of the valve body 19, but it may be slightly inclined as long as the protrusion 23p' can elastically contact it. Numeral 23a' indicates the end surface of the seal lip 23' that is in contact with the end surface of the guide tube 17.

The operation of the air pulser of the third embodiment is basically identical to that of the second embodiment. Thus its operation is described only with respect to what is different from the second embodiment. In this embodiment, since the protrusion 23p' of the seal lip 23' is in elastic contact with the stepped portion 24', the sealing arrangement of this invention is higher in sealability than the sealing arrangement of the first embodiment. This is because the protrusion 23p' is elastically pressed against the end surface 24b', so that large and uniform contact pressure is obtained over the entire circumference of the protrusion 23p'. Also, since the end surface 23a' of the seal lip 23' is supported on the end surface of the guide tube 17, even if the inner end of the seal lip 23' vibrates violently, the seal lip 23' will maintain its elasticity for a long period of time.

Thus, according to this embodiment, the sealability between the valve plate 11 and the valve body 19 further improves. This makes it possible to more reliably prevent leakage of high-pressure air into the second chamber through a gap between the valve plate 11 and the valve body 19, and thus to reliably control the intervals of air pulses.

What is claimed is:

1. An air pulser comprising:
a housing defining an inner space;
a diaphragm extending in said inner space to divide said inner space into an air supply chamber and an exhaust chamber, said diaphragm being formed with an aperture through which said air supply chamber communicates with said exhaust chamber;
an air injection tube provided in said air supply chamber and configured to be selectively opened and closed by said diaphragm;
a valve plate provided in said exhaust chamber and dividing said exhaust chamber into a first chamber and a second chamber, said valve plate being formed with a valve hole through which said first and second chambers communicate with each other;
a spring mounted in said first chamber for biasing and deforming said diaphragm such that said air injection tube is closed by said diaphragm;
a valve body provided in said second chamber for selectively opening and closing said valve hole, said valve body having a recessed surface formed at a radially outer periphery at an upper end thereof facing said valve plate;
a guide tube provided in said second chamber and supporting said valve body so as to be movable in an axial direction relative to said valve plate, said guide tube being formed with vent holes at both ends thereof, said second chamber communicating with the interior of said guide tube through said vent holes;
a permanent magnet mounted to said valve body and configured to be attracted to said valve body to keep said valve body in a closed position wherein said valve hole is closed by said valve body, said housing being formed with an air supply port through which compressed air is fed into said air supply chamber, and an exhaust port through which air in said second chamber is exhausted;
a suction disk mounted on an upper surface of said permanent magnet that faces said valve plate, said valve plate being formed with a plurality of angularly spaced apart radial grooves in a bottom surface thereof axially facing said suction disk, said surface of said valve plate being located at a radially inner portion of said valve plate; and
a seal member disposed between said valve plate and said guide tube and including an annular seal body and an annular seal lip projecting radially inwardly from said annular seal body, said seal lip being configured to be elastically pressed against said recessed surface of said valve body;
wherein said valve plate has an annular groove formed therein so as to face said annular seal lip;
wherein said seal lip is disposed between and axially faces said annular groove and said recessed surface;
wherein said annular groove is communicated with said valve hole through said radial grooves when said valve body is in said closed position;
wherein said seal lip has a flat bottom surface portion extending substantially perpendicular to said axial direction, and said recessed surface has an axially facing portion so as to axially face said flat bottom surface portion of said seal lip and such that said flat bottom surface portion of said seal lip is configured to be pressed against said axially facing portion of said recessed portion;
wherein said seal lip further has a radially inwardly facing surface;
wherein said recessed surface further has a radially outwardly facing portion;
wherein, in said closed position of said valve body, said radially inwardly facing surface of said seal lip radially faces said radially outwardly facing portion of said recessed surface;

wherein said valve plate has an annular seal groove formed in a bottom surface thereof;
wherein said seal body of said seal member is engaged in said annular seal groove of said valve plate;
wherein said annular seal groove opens in an axially downward direction;
wherein said suction disk has an axially facing surface that faces said surface of said valve plate having said angularly spaced apart radial grooves therein; and
wherein said axially facing surface of said suction disk is a solid flat surface in a portion thereof that faces said angularly spaced apart radial grooves of said valve plate.

2. The air pulser of claim 1 wherein said plurality of radial grooves are angularly spaced apart at equal angular intervals and have a V-shaped cross-section.

3. The air pulser of claim 1, wherein
said seal lip is arranged such that, when said valve body is in said closed position, said seal lip elastically contacts said recessed surface and, when pressure in said first chamber increases, a contact pressure of said seal lip against said recessed surface increases.

4. The air pulser of claim 1, wherein
said valve body is arranged such that, in said closed position of said valve body, said suction disk contacts said valve plate.

* * * * *